(12) United States Patent
Kikkawa et al.

(10) Patent No.: US 9,626,423 B2
(45) Date of Patent: Apr. 18, 2017

(54) INFORMATION PROCESSING APPARATUS, INFORMATION PROCESSING METHOD, AND PROGRAM FOR PROCESSING AND CLUSTERING POST INFORMATION AND EVALUATION INFORMATION

(71) Applicant: Sony Corporation, Tokyo (JP)

(72) Inventors: Norifumi Kikkawa, Tokyo (JP); Yuichi Kageyama, Tokyo (JP); Junichiro Takagi, Tokyo (JP); Mitsuhiro Hosoki, Tokyo (JP)

(73) Assignee: Sony Corporation, Tokyo (JP)

( * ) Notice: Subject to any disclaimer, the term of this patent is extended or adjusted under 35 U.S.C. 154(b) by 634 days.

(21) Appl. No.: 13/787,391

(22) Filed: Mar. 6, 2013

(65) Prior Publication Data

US 2013/0262468 A1 Oct. 3, 2013

(30) Foreign Application Priority Data

Mar. 30, 2012 (JP) ................................ 2012-082747

(51) Int. Cl.
*G06F 17/30* (2006.01)
*G06Q 50/00* (2012.01)
*G06Q 30/06* (2012.01)
*G06Q 30/02* (2012.01)

(52) U.S. Cl.
CPC .. *G06F 17/30598* (2013.01); *G06F 17/30867* (2013.01); *G06Q 30/02* (2013.01); *G06Q 50/01* (2013.01); *G06F 17/3053* (2013.01); *G06F 17/3071* (2013.01); *G06F 17/30864* (2013.01); *G06Q 30/0269* (2013.01); *G06Q 30/0631* (2013.01)

(58) Field of Classification Search
CPC ......... G06F 17/30707; G06F 17/30876; G06F 17/30705; G06F 17/3071; G06F 17/30867; G06F 17/2785; G06F 17/30643
USPC ....... 707/740, 737, 738, 751, 752, 758, 776; 705/319
See application file for complete search history.

(56) References Cited

U.S. PATENT DOCUMENTS

| | | | |
|---|---|---|---|
| 7,752,251 B1 * | 7/2010 | Shuster et al. ................ | 709/200 |
| 8,122,031 B1 * | 2/2012 | Mauro et al. ................ | 707/748 |
| 8,150,860 B1 * | 4/2012 | Cierniak et al. ............. | 707/750 |
| 8,306,922 B1 * | 11/2012 | Kunal et al. .................. | 705/319 |
| 8,386,519 B2 * | 2/2013 | Kenedy ............. | G06Q 30/0631 707/784 |
| 8,402,094 B2 * | 3/2013 | Bosworth ............. | G06Q 30/08 705/319 |

(Continued)

FOREIGN PATENT DOCUMENTS

JP 2007-233875 A 9/2007

*Primary Examiner* — Dangelino Gortayo
(74) *Attorney, Agent, or Firm* — Chip Law Group

(57) ABSTRACT

An information processing apparatus includes a communication unit and a control unit. The control unit is configured to control the communication unit to receive a plurality of pieces of post information sent from a first user, to obtain a plurality of pieces of evaluation information of another user with respect to the received plurality of post information, to classify the plurality of pieces of post information into a plurality of clusters, and to determine, as an advantage cluster of the first user, a cluster with the highest evaluation in the plurality of pieces of evaluation information out of the plurality of clusters.

18 Claims, 8 Drawing Sheets

(56) References Cited

U.S. PATENT DOCUMENTS

| | | | |
|---|---|---|---|
| 8,676,937 B2* | 3/2014 | Rapaport | H04L 51/32 709/219 |
| 8,738,603 B2* | 5/2014 | Fischer | G06F 17/30867 707/709 |
| 8,832,099 B2* | 9/2014 | Howes | G06F 17/30011 705/14.1 |
| 2008/0319827 A1* | 12/2008 | Yee | G06Q 30/02 705/7.29 |
| 2011/0173198 A1* | 7/2011 | Malleshaiah et al. | 707/737 |
| 2011/0191372 A1* | 8/2011 | Kaushansky et al. | 707/776 |
| 2013/0117261 A1* | 5/2013 | Sambrani | G06F 17/30867 707/734 |

* cited by examiner

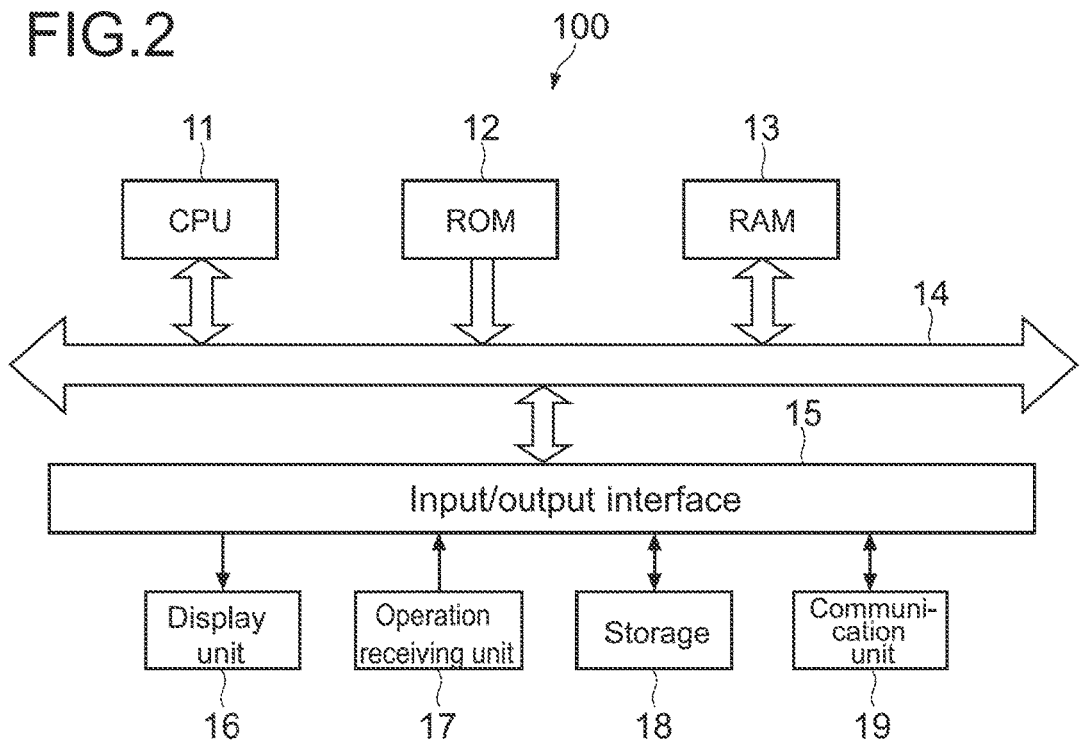
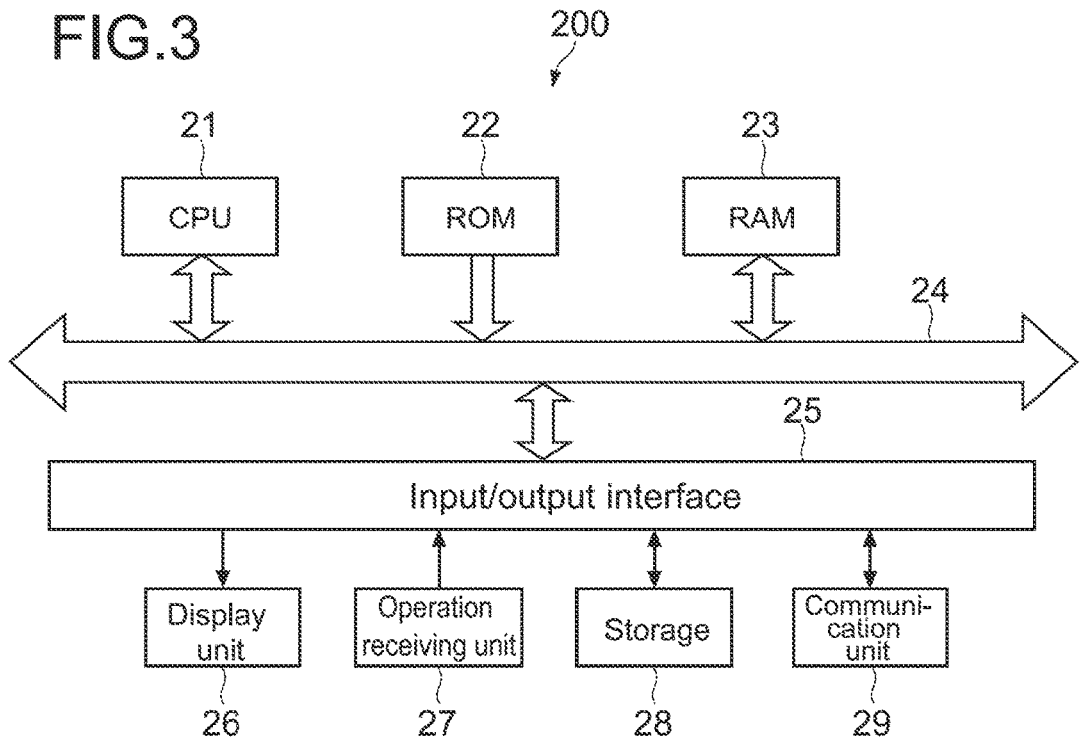

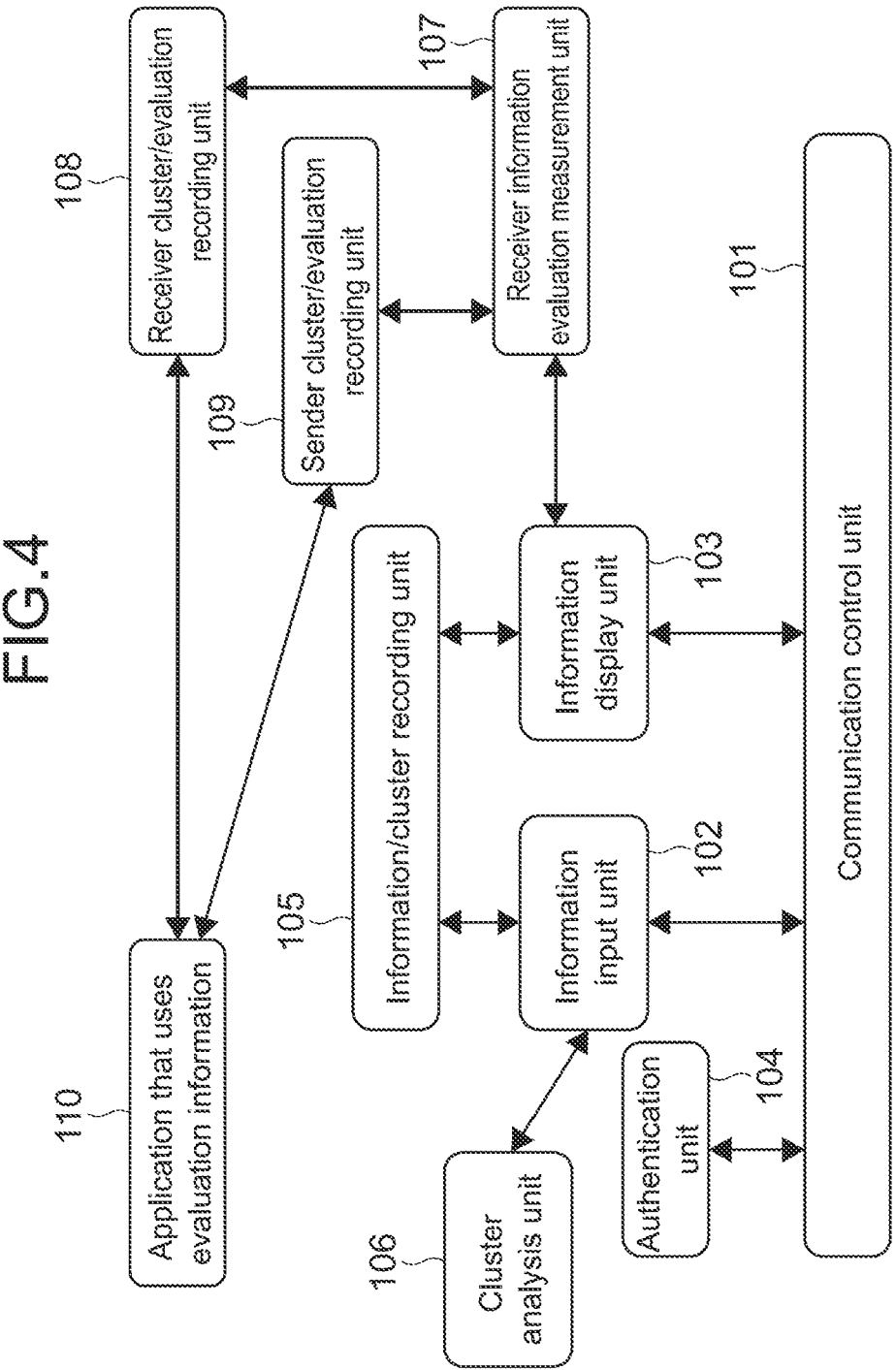

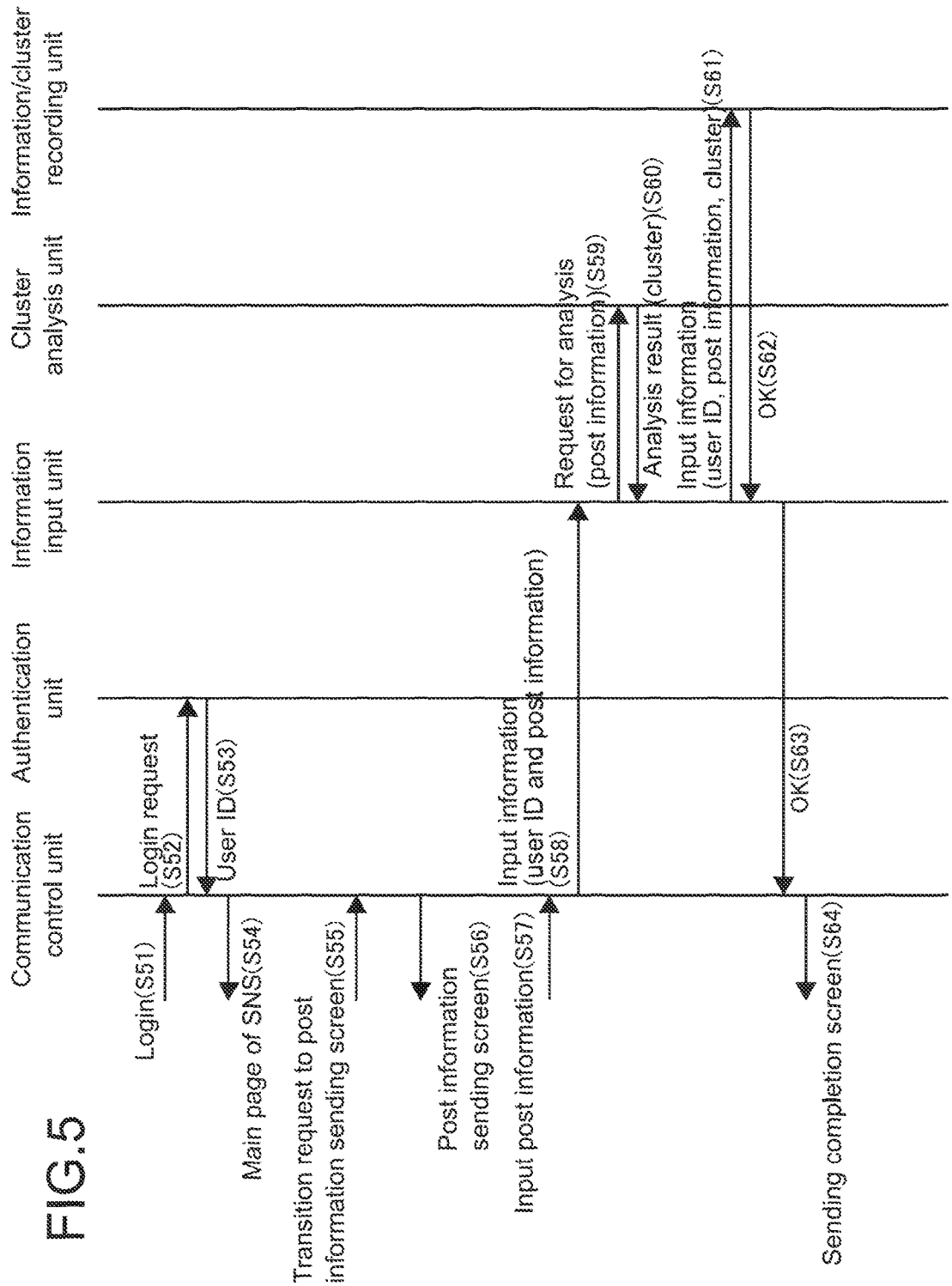

INFORMATION PROCESSING APPARATUS, INFORMATION PROCESSING METHOD, AND PROGRAM FOR PROCESSING AND CLUSTERING POST INFORMATION AND EVALUATION INFORMATION

BACKGROUND

The present disclosure relates to an information processing apparatus capable of communicating with another information processing apparatus, and to an information processing method and a program for the information processing apparatus.

An SNS (Social Networking System) is a system that allows mutual communication based on a relationship of a user's friend or a friend of a friend. In the SNS, a user can evaluate information sent (posted) from another user. From the past, various attempts using the evaluation information have been made.

For example, Japanese Patent Application Laid-open No. 2007-233875 discloses that when a terminal used by a user A displays post data a, which is sent from a sender C to a server, how a user B, who has a similar evaluation tendency to the user A, evaluates the post data a or the sender C is determined, and a method of displaying the post data a for the user A is determined based on the evaluation results.

SUMMARY

In the technique described in Japanese Patent Application Laid-open No. 2007-233875, however, a user who browses post data can be classified with the similarity degree of the evaluation tendency, but no classification processing is performed on a sender of the post data.

In view of the circumstances as described above, it is desirable to provide an information processing apparatus, an information processing method, and a program that are capable of classifying a sender of information based on evaluation information sent from a receiver of the information.

According to an embodiment of the present disclosure, there is provided an information processing apparatus including a communication unit and a control unit. The control unit is configured to control the communication unit to receive a plurality of pieces of post information sent from a first user. Further, the control unit is configured to obtain a plurality of pieces of evaluation information of another user with respect to the received plurality of post information, to classify the plurality of pieces of post information into a plurality of clusters, and to determine, as an advantage cluster of the first user, a cluster with the highest evaluation in the plurality of pieces of evaluation information out of the plurality of clusters.

With this configuration, the information processing apparatus can classify a sender of information and determine an advantage cluster of the sender based on evaluation information sent from a receiver of the information.

The control unit may classify a plurality of pieces of evaluation information sent from a second user into a plurality of clusters, and determine, as a favorite cluster of the second user, a cluster with the highest evaluation out of the plurality of clusters.

With this configuration, the information processing apparatus can determine an advantage cluster of the receiver by classifying evaluation information sent from the sender of information with use of an advantage cluster of the sender of information, which is determined by classifying post information.

The control unit may control the communication unit to send information that represents the advantage cluster of the first user in response to a request from an apparatus used by a second user.

With this configuration, the information processing apparatus allows another user to easily know a favorite field of the first user.

The control unit may control the communication unit to send information that represents the favorite cluster of the second user in response to a request from an apparatus used by the first user.

With this configuration, the information processing apparatus allows another user to easily know a favorite field of the second user.

The control unit may control the communication unit to send, to an apparatus used by the second user, recommendation information that recommends to continuously receive post information sent from the first user in a case where the advantage cluster of the first user and the favorite cluster of the second user are the same.

With this configuration, the second user can continuously receive useful information for him/her without searching for it by himself/herself. On the other hand, the first user can be evaluated properly by sending information to a user who has a similar taste to him/her and being evaluated by the user, compared with a case where he/she is evaluated by another user.

The control unit may classify the received plurality of post information into any one of the plurality of clusters, and control the communication unit so that the received plurality of post information are received by only an apparatus used by a user who has a favorite cluster that is the same as the classified cluster.

With this configuration, the first user allows only a user who has a similar taste to him/her to browse his/her post information, and can be evaluated properly by the user.

The control unit may classify commodity information on a predetermined commodity into any one of the plurality of clusters. Further the control unit may output, as an evaluation value of the commodity information, a value obtained by applying weights to evaluation information of different users with respect to the commodity information by the degree of taste of the different users with respect to the classified cluster.

With this configuration, the information processing apparatus can improve the reliability of the evaluation value by applying weights to the reliability of item information in an auction with a favorite cluster of a user who has evaluated the item information and evaluating the reliability of item information.

The control unit may classify one of each of a plurality of pieces of commodity information and each of a plurality of pieces of article information into any one of the plurality of clusters. Further, the control unit may extract evaluation information sent from a user whose favorite cluster is the same as the classified cluster out of evaluation information of a plurality of users with respect to one of the plurality of pieces of commodity information and the plurality of pieces of article information. Further, the control unit may generate recommendation information that recommends one of commodity information and article information with high evaluation in the extracted evaluation information out of one of the plurality of pieces of commodity information and the plurality of pieces of article information.

With this configuration, the user can receive a recommendation for a commodity or an article, which is highly evaluated by a user who is considered to have a high degree of taste for the commodity or the article, and easily select a commodity to be bought or an article to be read.

The control unit may specify a user group as a spam group in a case where it is detected that evaluation in a plurality of pieces of evaluation information with respect to post information sent from a plurality of users belonging to the user group is high in the user group, and low in the other many users, the user group including the plurality of users, the plurality of users having a common favorite cluster.

With this configuration, the information processing apparatus can specify, in the case where there is a group that has a common favorite cluster, a spam group based on evaluation information on the group.

The control unit may generate recommendation information that recommends a community in a case where evaluation in evaluation information with respect to post information sent from a user belonging to the community is high, the community including a plurality of users whose favorite clusters are the same.

With this configuration, the information processing apparatus can recommend, in the case where there is a community that has a common favorite cluster, the community based on evaluation information on the community.

The control unit may generate recommendation information that recommends, for the second user, post information sent from a user, the post information belonging to a favorite cluster, a predetermined number or more of users having the favorite cluster, the favorite cluster being different from the favorite cluster of the second user.

With this configuration, the information processing apparatus allows the second user to broaden his/her perspective with the help of opinions from a certain number of users, which are opposed to an opinion of the second user.

The control unit may generate display information that displays the number of users for each favorite cluster, the users having a common favorite cluster.

With this configuration, the information processing apparatus can visualize the number of supporters or the difference in the momentum in the opposing opinions, and use it for market analysis.

The control unit may detect a correlation between a relationship between a first favorite cluster and a second favorite cluster with respect to first post information, and a relationship between a third favorite cluster and a fourth favorite cluster with respect to second posted information.

With this configuration, the information processing apparatus can detect, as a correlation between favorite clusters, that evaluation of information is divided in the same way as evaluation of other information, and use it for market analysis and the like.

The control unit may obtain evaluation information of the first user with respect to post information sent from another user. Further, the control unit may classify the post information into any one of the plurality of clusters. Further, the control unit may increase an evaluation value that is represented by the evaluation information in a case where the classified cluster and the advantage cluster of the first user are the same.

With this configuration, the information processing apparatus can evaluate evaluation information more properly based on an evaluation value obtained from a user who has a high degree of taste for it.

According to another embodiment of the present disclosure, there is provided an information processing method, including receiving a plurality of pieces of post information sent from a user. A plurality of pieces of evaluation information of another user with respect to the received plurality of post information are obtained. The plurality of pieces of post information into a plurality of clusters are classified. A cluster with the highest evaluation in the plurality of pieces of evaluation information out of the plurality of clusters is determined as an advantage cluster of the user.

According to still another embodiment of the present disclosure, there is provided a program that causes an information processing apparatus to execute a receiving step, an obtaining step, a classifying step, and a determining step. In the receiving step, a plurality of pieces of post information sent from a user are received. In the obtaining step, a plurality of pieces of evaluation information of another user with respect to the received plurality of post information are obtained. In the classifying step, the plurality of pieces of post information into a plurality of clusters are classified. In the determining step, a cluster with the highest evaluation in the plurality of pieces of evaluation information out of the plurality of clusters is determined as an advantage cluster of the user.

As described above, according to the present disclosure, it is possible to classify a sender of information based on evaluation information sent from a receiver of the information.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 2 is a block diagram showing a hardware configuration of an SNS server in the system;

FIG. 3 is a block diagram showing a hardware configuration of a user terminal in the system;

FIG. 4 is a block diagram showing a software module configuration of the SNS server in the system;

FIG. 5 is a sequence diagram showing a flow of processing when post information is sent from the user terminal in the system;

DETAILED DESCRIPTION OF EMBODIMENTS

Hereinafter, embodiments according to the present disclosure will be described with reference to the drawings.

First Embodiment

A first embodiment of the present disclosure will first be described.

[Network Configuration of System]

Figure 1:
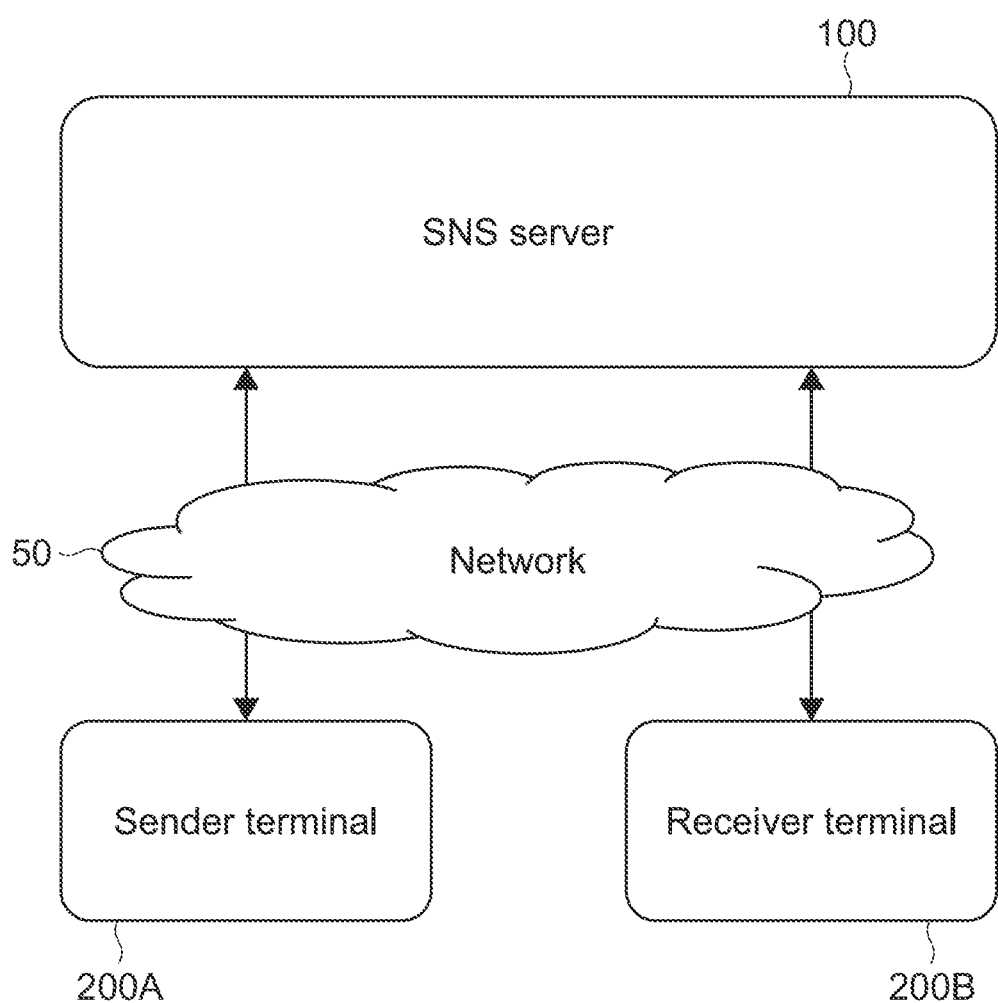
FIG. 1 is a diagram showing a network configuration of a system according to a first embodiment of the present disclosure.

FIG. 1 is a diagram showing a network configuration of a system according to this embodiment.

As shown in FIG. 1, this system includes an SNS (Social Networking Service) server 100 in cloud computing and a plurality of user terminals 200. They are capable of communicating with each other through a network 50 such as the Internet.

The SNS server 100 establishes a social network between users of the user terminals 200, and provides a communication service (social network service) between the users.

The user terminals 200 are owned by users who are registered in the SNS server 100. The user terminals 200 can send post information from a user to the SNS server 100, receive post information that has been posted to the SNS server 100, and send a comment (evaluation information) on the post information.

In this embodiment, a user terminal 200 that sends post information is referred to as sender terminal 200A, and a user terminal 200 that receives the post information is referred to as receiver terminal 200B. However, the functions and configurations of the sender terminal 200A and the receiver terminal 200B are not different from each other. The sender terminal 200A can be the receiver terminal 200B, and the receiver terminal 200B can be the sender terminal 200A. In FIG. 1, for convenience of explanation, one sender terminal and one receiver terminal are shown as the user terminal 200. However, a lot of user terminals 200 can be connected to the SNS server 100 actually.

The user terminal 200 may include any information processing apparatus such as a smartphone, a cellular phone, a tablet PC (Personal Computer), a desktop PC, a notebook PC, a PDA (Personal Digital Assistant), a portable AV (Audio Visual) player, an electronic book, a digital still camera, a camcorder, a television receiver, a PVR (Personal Video Recorder), a game machine, a projector, a car navigation system, a digital photo frame, an HDD (Hard Disk Drive) apparatus, a healthcare apparatus, and a household appliance.

[Hardware Configuration of SNS Server]

FIG. 2 is a diagram showing a hardware configuration of the SNS server 100. As shown in FIG. 2, the SNS server 100 includes a CPU (Central Processing Unit) 11, a ROM (Read Only Memory) 12, a RAM (Random Access Memory) 13, an input/output interface 15, and a bus 14 for connecting those components to each other.

The CPU 11 appropriately accesses the RAM 13 and the like as necessary, and performs overall controls of the entire block of the SNS server 100 while performing various types of arithmetic processing. The ROM 12 is a non-volatile memory in which an OS (Operating System) to be executed by the CPU 11 and firmware such as a program and various parameters are fixedly stored. The RAM 13 is used as, for example, a work area of the CPU 11, and temporarily stores the OS, various executing applications and various types of data in process.

To the input/output interface 15, a display unit 16, an operation receiving unit 17, a storage 18, a communication unit 19, and the like are connected.

The display unit 16 is a display device using, for example, an LCD (Liquid Crystal Display), an OELD (Organic ElectroLuminescence Display), and a CRT (Cathode Ray Tube).

The operation receiving unit 17 is, for example, a pointing device such as a mouse, a keyboard, a touch panel, or another input apparatus. In the case where the operation receiving unit 17 includes a touch panel, the touch panel may be integrated with the display unit 16.

The storage 18 is a non-volatile memory such as an HDD (Hard Disk Drive), a flash memory (SSD; Solid State Drive), and another solid-state memory. The storage 18 stores the OS, various applications, and various types of data. In particular, in this embodiment, the storage 18 stores a program such as a plurality of software modules to be described alter, post information received from the sender terminal 200A, evaluation information received from the receiver terminal 200B, cluster information (to be described later) for classifying the evaluation information, and the like. The program may be provided to the SNS server 100 through the network 50, or may be provided as a recording medium that can be read in the SNS server 100.

The communication unit 19 is a NIC (Network Interface Card) or the like for connecting to the network 50 and performs communication processing between the communication unit 19 and the user terminal 200.

[Hardware Configuration of User Terminal]

FIG. 3 is a block diagram showing a hardware configuration of the user terminal 200. As shown in FIG. 3, also the hardware configuration of the user terminal 200 is basically the same as that of the SNS server 100. Specifically, the user terminal 200 includes a CPU 21, a ROM 22, a RAM 23, an input/output interface 25, and a bus 24 for connecting those components to each other, a display unit 26, an operation receiving unit 27, a storage 28, and a communication unit 29. Here, the display unit 26 may be incorporated in the user terminal 200, or may be externally connected to the user terminal 200.

The CPU 21 controls each block such as the storage 28 and the communication unit 29, and performs communication processing between the CPU 21 and the SNS server 100, or various types of data processing.

The storage 28 stores a program such as a plurality of software modules to be described later, and various databases. The program may be provided to the user terminal 200 through the network 50, or may be provided as a recording medium that can be read in the user terminal 200.

In the case where the user terminal 200 includes a mobile apparatus such as a smartphone, the communication unit 29 may include a module for wireless communication such as a wireless LAN.

Other than that, the user terminal 200 may include a sensor that detects various operations performed by a user in cooperation with a receiver information evaluation measurement unit to be described later.

[Software Module Configuration of SNS Server]

FIG. 4 is a block diagram showing a software module configuration of the SNS server 100.

As shown in FIG. 4, the SNS server 100 includes software modules, i.e., a communication control unit 101, an information input unit 102, information display unit 103, an authentication unit 104, an information/cluster recording unit 105, a cluster analysis unit 106, a receiver information evaluation measurement unit 107, a receiver cluster/evaluation recording unit 108, and a sender cluster/evaluation recording unit 109, and an application 110 that uses evaluation information processed by the modules.

The communication control unit 101 exchanges various types of information between the sender terminal 200A and the receiver terminal 200B in cooperation with the communication unit 19. In particular, to the communication control unit 101, post information sent from the sender terminal 200A is input. Moreover, the communication control unit 101 has a similar function to a front end in a Web server, and performs a basic Web operation such as an output of a main page of SNS.

The information input unit 102 processes information received by the communication control unit 101, requests the cluster analysis unit 106 to perform clustering on the information, and causes the information/cluster recording unit 105 to record post information subjected to clustering.

The information display unit 103 passes information generated by the information/cluster recording unit 105 to the communication control unit 101 to cause the sender terminal 200A or the receiver terminal 200B to display the information.

The authentication unit 104 performs user authentication processing with a user ID and a password in response to a login request from the sender terminal 200A or the receiver terminal 200B, and thus specifies the user.

The information/cluster recording unit 105 functions as a database that stores, in relation to cluster information classified by the cluster analysis unit 106, post information sent from the sender terminal 200A, which is input to the information input unit 102. Moreover, the information/cluster recording unit 105 outputs the recorded post information or cluster information in response to a request from the information display unit 103 or the like.

The cluster analysis unit 106 performs clustering processing, which classifies post information sent from the sender terminal 200A into a plurality of clusters, in response to a request from the information input unit 102. The clustering is performed by, for example, checking what words are included in post information with use of a dictionary in which words are registered for each cluster in advance. More particularly, in a dictionary for a soccer cluster, soccer terminology or a soccer player name is registered as a word.

The receiver information evaluation measurement unit 107 detects the content of operation performed by a user (receiver) such as a button pressing and a screen scroll with respect to post information in the receiver terminal 200B, and measures evaluation information represented by the content of the operation.

The receiver cluster/evaluation recording unit 108 classifies the evaluation information into each of the clusters, and records the evaluation information as information that represents a taste/interest of the receiver for a specific cluster.

The sender cluster/evaluation recording unit 109 records the evaluation information for each of the clusters as information that represents an advantage of a sender of the post information to be evaluated for the specific cluster.

[Operation of System]

Next, operations of the SNS server 100 and the user terminal 200 in the system configured as described above will be described. In this embodiment and another embodiment, the operations of the SNS server 100 and the user terminal 200 are performed by the cooperation between the CPU and each of the software modules executed under the control of the CPU.

In this embodiment, the SNS server 100 evaluates a sender by analyzing evaluation tendencies of all receivers of post information with respect to the post information. The evaluation of the sender is performed for each cluster, and a sender who is highly evaluated in the post information is specified as an important sender in a cluster to which the post information belongs. Whether or not the sender is highly evaluated is determined by, for example, the combination of overall evaluation of information sent from the sender per unit time and average evaluation of information per information. A cluster in which the sender is highly evaluated in the post information is determined as an advantage cluster.

On the other hand, the SNS server 100 evaluates what information a receiver of the post information is interested in by performing clustering on evaluation information sent from the receiver with respect to the post information. A cluster to which post information that is highly evaluated by the receiver belongs is determined as a favorite cluster of the receiver. Which post information of a cluster is highly evaluated by the receiver is different for each receiver depending on the taste of the receiver.

Hereinafter, a specific processing flow in this embodiment will be described.

(Post Information Sending Processing)

The processing of the SNS server 100 when the sender terminal 200A sends post information will first be described.

FIG. 5 is a sequence diagram showing a flow of the processing when the post information is sent.

As shown in FIG. 5, when receiving a login request with a user ID and a password from the sender terminal 200A (Step 51), the communication control unit 101 of the SNS server 100 requests a login to the authentication unit 104 (Step 52).

The authentication unit 104 returns, to the communication control unit 101, the result of the user authentication with the user ID and the password in response to the login request (Step 53).

Next, the communication control unit 101 causes a browser of the sender terminal 200A to display a main page of SNS in the case where the user authentication has succeeded (Step 54).

Next, the communication control unit 101 receives a transition request to a post information sending screen from the sender terminal 200A (Step 55), and sends a post information sending screen in response to the request (Step 56).

Next, the communication control unit 101 receives an input of post information from the sender terminal 200A (Step 57), and sends, to the information input unit 102, the post information together with the user ID of the sender (Step 58).

Next, the information input unit 102 sends, to the cluster analysis unit 106, a cluster analysis request for performing clustering on the post information together with the post information (Step 59).

The cluster analysis unit 106 performs clustering in response to the cluster analysis request, and returns the analysis result (information for identifying a cluster into which the post information is classified (hereinafter referred to as cluster information)) (Step 60).

Next, the information input unit 102 sends, to the information/cluster recording unit 105, the post information together with the user ID and the cluster information, and requests the information/cluster recording unit 105 to record them in relation to each other (Step 61).

When the recording processing is completed, the information/cluster recording unit 105 sends that fact to the information input unit 102 (Step 62).

The information input unit 102 sends, to the communication control unit 101, the fact that sending processing of the post information is completed in response to the completion of the recording processing (Step 63).

The communication control unit 101 sends a screen that notifies the completion to the sender terminal 200A, and thus the sending processing of the post information is completed (Step 64).

(Post Information Display Processing)

Figure 6:
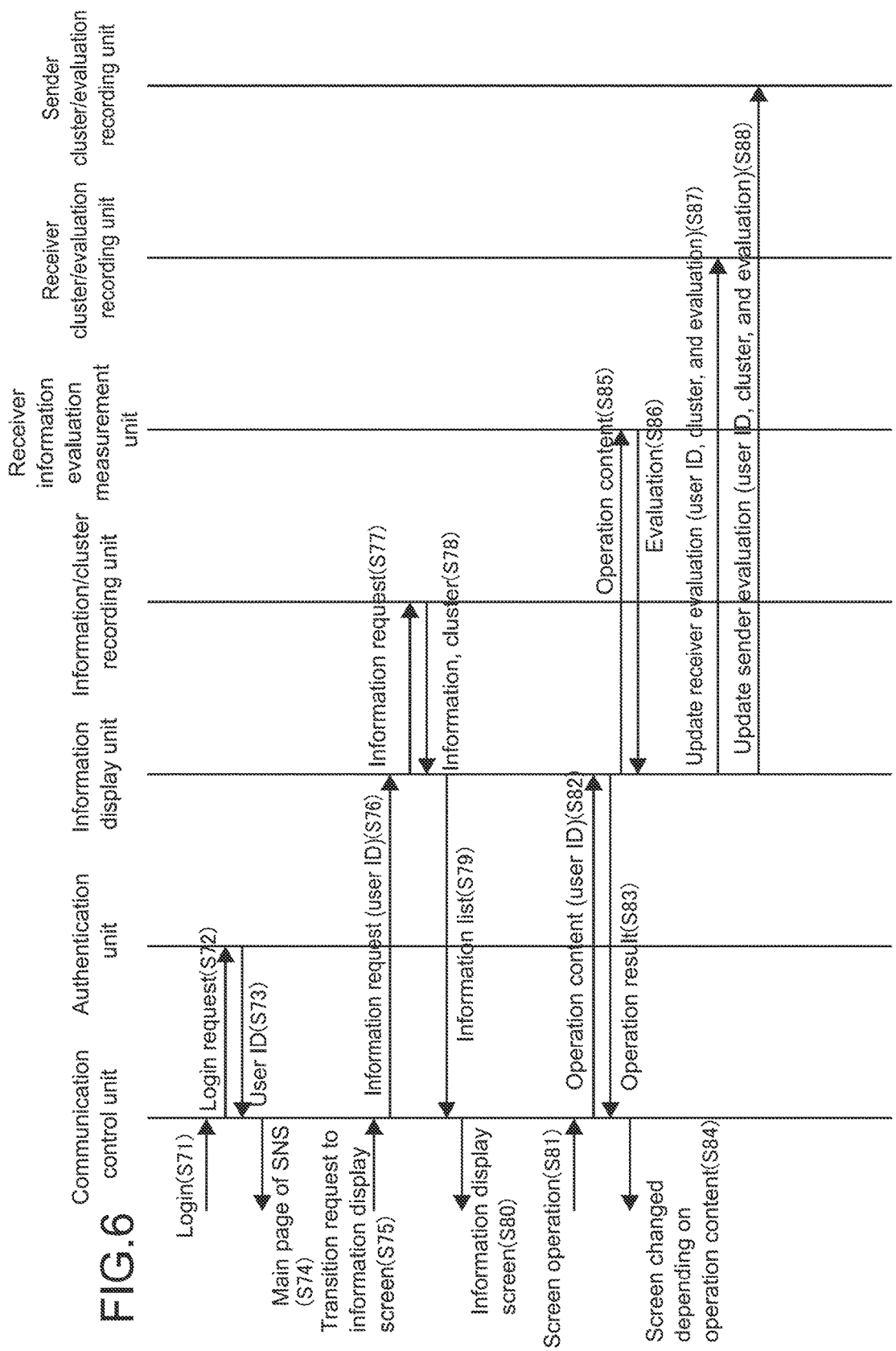
FIG. 6 is a sequence diagram showing a flow of processing when the post information is displayed in the user terminal in the system.

Next, the processing of the SNS server 100 when post information is displayed in the receiver terminal 200B will be described. FIG. 6 is a sequence diagram showing a flow of the processing when the post information is displayed.

As shown in FIG. 6, when receiving a login request with a user ID and a password from the receiver terminal 200B (Step 71), the communication control unit 101 of the SNS server 100 requests a login to the authentication unit 104 (Step 72).

The authentication unit 104 returns, to the communication control unit 101, the result of the user authentication with the user ID and the password in response to the login request (Step 73).

Next, the communication control unit 101 sends a main page of SNS and causes a browser of the receiver terminal 200B to display the main page of SNS in the case where the user authentication has succeeded (Step 74).

Next, when receiving a transition request to a post information display screen from the receiver terminal 200B (Step 75), the communication control unit 101 requests the information display unit 103 to display the post information (Step 76). At this time, the communication control unit 101 sends the display request together with the user ID of a specific user in the case where there is a display request for post information sent from the specific user to whom subscription has been set in advance by the receiver terminal 200B (e.g., follow in Twitter (registered trademark)).

The information display unit 103 requests the post information from the information/cluster recording unit 105 in response to the display request (Step 77).

The information/cluster recording unit 105 extracts corresponding post information and cluster information corresponding to the post information in response to the request, and returns them to the information display unit 103 (Step 78).

The information display unit 103 creates a list of post information based on the post information and the cluster information thus obtained, and sends the list to the communication control unit 101 (Step 79).

The communication control unit 101 generates a post information display screen based on the list of the post information, sends the screen to the receiver terminal 200B, and causes a browser of the receiver terminal 200B to display the screen (Step 80).

Next, the communication control unit 101 detects an operation of a receiver on the post information display screen of the receiver terminal 200B (Step 81), and sends, to the information display unit 103, information that represents the content of the operation together with the user ID of the receiver (Step 82). The operation content is a scroll operation, a pressing operation of a high evaluation button (e.g., Like button in facebook (registered trademark)), or the like. Alternatively, for example, it may be detected that the post information display screen does not transit to another screen and a predetermined time has elapsed without any operation, as operation information.

Next, the information display unit 103 changes the post information display screen depending on the operation content, and sends the changed screen to the communication control unit 101 (Step 83).

The communication control unit 101 sends the changed screen to the receiver terminal 200B, and causes a browser of the receiver terminal 200B to display the changed screen (Step 84).

On the other hand, the information display unit 103 sends information on the operation content to the receiver information evaluation measurement unit 107 (Step 85).

The receiver information evaluation measurement unit 107 measures evaluation of the receiver terminal 200B with respect to the displayed post information based on the information on the operation content, and sends the evaluation information to the information display unit 103 (Step 86). The evaluation measurement is performed by a scroll speed, whether or not a high evaluation button is pressed, or the like. More specifically, how long the receiver stops the scroll on the post information display screen (how much the scroll speed is close to 0) is determined, and it is detected that the degree of taste for the post information is high as the stop period is long. In the case where a high evaluation button is pressed, it is determined that evaluation for the post information is high, of course.

Next, the information display unit 103 sends, to the receiver cluster/evaluation recording unit 108, the evaluation information together with the user ID of the receiver and cluster information to which the post information belongs.

The receiver cluster/evaluation recording unit 108 updates evaluation information of the receiver for each cluster corresponding to the user ID by recording the evaluation information in relation to the cluster information and the user ID (Step 87).

The receiver cluster/evaluation recording unit 108 determines a cluster, which has a lot of high evaluation in the evaluation information compared with the overall average, as a favorite cluster of the receiver.

The information display unit 103 sends, also to the sender cluster/evaluation recording unit 109, the evaluation information together with the user ID of the sender of the post information and cluster information to which the post information belongs.

The sender cluster/evaluation recording unit 109 updates evaluation information of the sender for each cluster corresponding to the user ID by recording the evaluation information in relation to the cluster information and the user ID (Step 88).

The sender cluster/evaluation recording unit 109 determines a cluster, which has a lot of high evaluation in the evaluation information compared with the overall average, as an advantage cluster of the sender.

The receiver cluster/evaluation recording unit 108 recalculates the favorite cluster every time the evaluation information is updated, and the sender cluster/evaluation recording unit 109 recalculates the advantage cluster every time the evaluation information is updated.

The receiver cluster/evaluation recording unit 108 has a function to return a favorite cluster of a specific user in response to an inquiry about the specific user from the user terminal 200. Similarly, the sender cluster/evaluation recording unit 109 has a function to return an advantage cluster of a specific user in response to an inquiry about the specific user from the user terminal 200.

[Application Example]

Information on the advantage cluster and information on the favorite cluster, which are determined in the processing described above, are provided to an application to be used. In the following, specific examples of an application using the advantage cluster and the favorite cluster will be described.

(First Application Example)

A first application example will first be described. The first application is an application that displays an influential sender in ranking for each cluster and causes a receiver to continuously make a receiving setting.

Figure 7:
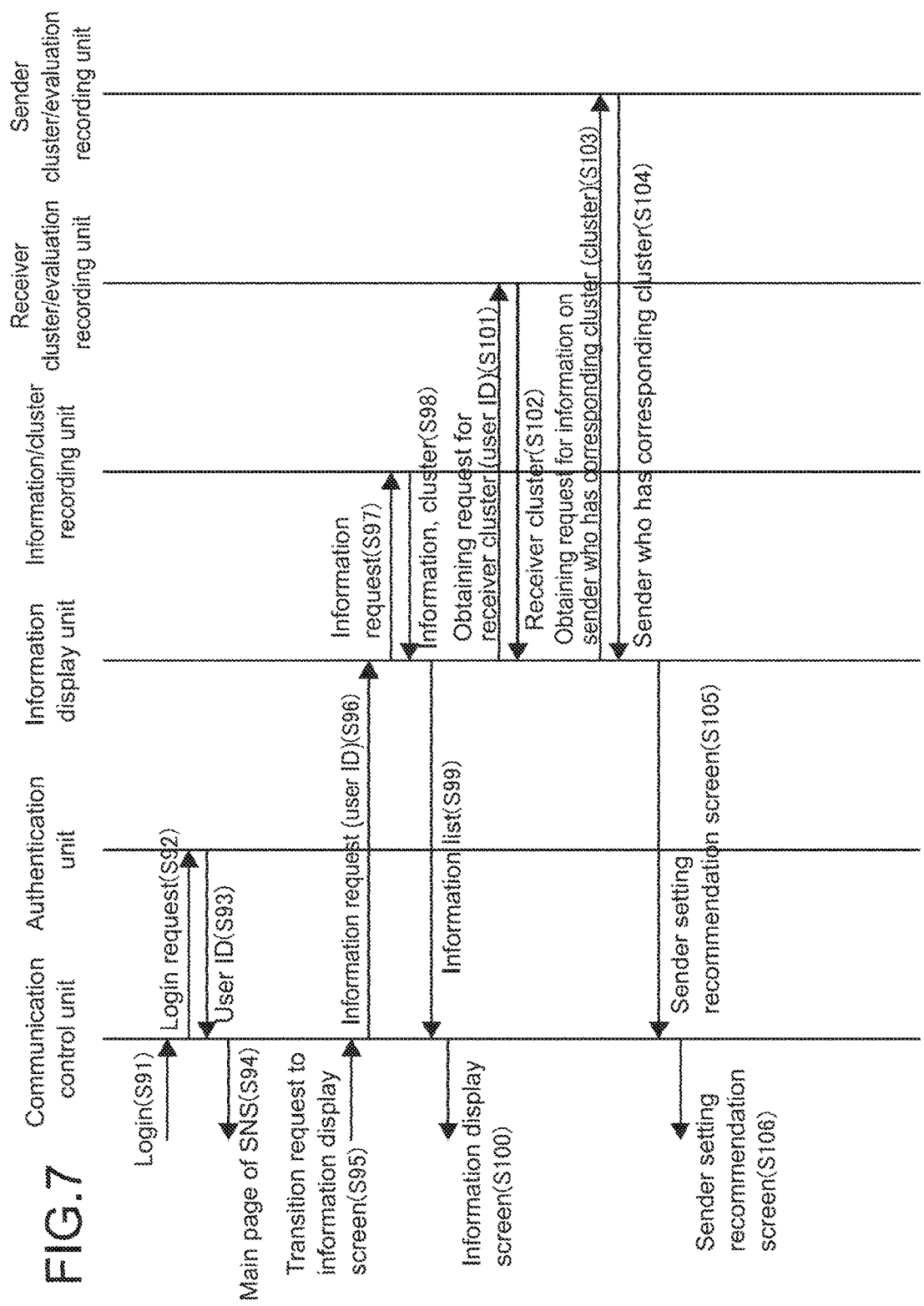
FIG. 7 is a sequence diagram showing a flow of processing when a sender setting recommend application is executed in the system.

FIG. 7 is a sequence diagram showing a flow of the processing when the post information is displayed by using the application.

In FIG. 7, the processing of Step 91 to Step 100 (from login to display of post information) is the same as that of Step 71 to Step 80 in the display processing shown in FIG. 6.

The information display unit 103 sends, to the receiver cluster/evaluation recording unit 108, an obtaining request for a favorite cluster of a receiver being a user of the receiver terminal 200B with the user ID of the receiver as a key after sending the list of post information (Step 101).

The receiver cluster/evaluation recording unit 108 returns the favorite cluster of the receiver in response to the request (Step 102).

Next, the information display unit 103 sends, to the sender cluster/evaluation recording unit 109, an obtaining request for information on a sender who has the same cluster as the favorite cluster of the receiver as an advantage cluster, which is obtained from the receiver cluster/evaluation recording unit 108, with the favorite cluster as a key (Step 103).

The sender cluster/evaluation recording unit 109 returns information on a corresponding sender (user ID or a user name) in response to the request (Step 104).

Next, the information display unit 103 generates a screen that recommends to make a setting for continuously subscribing to post information sent from a sender who has an advantage cluster corresponding to the favorite cluster, and sends it to the communication control unit 101 (Step 105).

The communication control unit 101 sends the recommendation screen to the receiver terminal 200B, and causes a browser of the receiver terminal 200B to display the recommendation screen. The recommendation screen is displayed as a recommendation area of a part of the post information display screen, for example (Step 106).

In the case where there is a request for a continuous subscription from a receiver on the recommendation screen, the communication control unit 101 makes a setting for the continuous subscription to the information display unit 103.

As a result, the receiver can continuously receive post information sent from a sender who is likely to send useful information for him/her without searching for the sender by himself/herself.

(Second Application Example)

Next, a second application example will be described. The application is an information sending application in which a posting destination is selected automatically for a receiver who has a specific favorite cluster when a sender sends post information.

The application has a receiver filtering function. Specifically, the function is a (filtering) function in which clustering is performed on the content of post information prepared by a sender with no designation of a receiver, and the post information is posted to only a receiver who has a favorite cluster that is a cluster corresponding to the content of the post information out of receiver candidates (not received by another candidate).

Accordingly, the sender can cause the application to automatically select a receiver who has the same taste as he/she, i.e., a receiver who is desired to read his/her post information without searching for the receiver by himself/herself.

(Third Application Example)

Next, a third application will be described. The application is an application that can be used for foreseeing the trend by detecting a sender who has a specific advantage cluster as an opinion leader, and analyzing the content of post information sent from the sender.

Specifically, the SNS server 100 can provide, as trend information in the future, post information sent from a sender who has a specific advantage cluster to employers of various business fields.

(Fourth Application Example)

Next, a fourth application will be described. The application is an application that can clearly indicate the reliability of a seller in an auction.

In the application, not only a sender as a seller but also (theme of) sending (selling) information sent from the sender can be evaluated in the same manner by performing clustering on the information.

At this time, an evaluation value of the sending information is determined by a cluster of the receiver, as shown in the following equation.

$$\text{Value of information in a cluster} = \Sigma(\text{the degree of taste of a receiver for the cluster} \times \text{evaluation of the receiver at the time of reception})$$

Specifically, in the application, value of item information that belongs to a cluster is calculated as an evaluation value of a receiver with respect to the item information added with weight by the degree of taste of the receiver with respect to the cluster.

The degree of taste described above is calculated in the same way as the favorite cluster is determined.

Accordingly, a user of an auction service can buy a commodity for sale at ease with the help of the evaluation value.

(Fifth Application Example)

Next, a fifth application will be described. The application is an application that can recommend a commodity, which is cheap for evaluation, by evaluating value of a commodity for sale in an auction or the like.

Specifically, the application analyzes evaluation information sent from all of the receivers with respect to a commodity, and calculates an evaluation value as a whole. Meanwhile, the application calculates an evaluation value of a receiver who has a specific cluster (e.g., soccer cluster) as his/her favorite cluster. Then, the application generates recommendation information that recommends a commodity, which is highly evaluated in the latter evaluation value and has a big difference in both of the evaluation values, as a cheaper commodity.

The application evaluates information whose cluster is unknown originally by a favorite cluster of a receiver. The degree of importance of the information in a specific favorite cluster is calculated as value of the information.

Accordingly, a buyer of a commodity can easily find a cheaper commodity.

(Sixth Application Example)

Next, a sixth application will be described. The application is an application that can recommend an article (e.g., news), which is highly evaluated by a receiver who has a specific favorite cluster, for only a receiver who has the specific favorite cluster.

Also the application evaluates information whose cluster is unknown originally by a favorite cluster of a receiver.

For example, news that is highly evaluated by a receiver who has a favorite cluster of classic music is recommended for another receiver who has the favorite cluster of classic music.

Accordingly, a receiver can easily obtain more reliable information for which the receiver has high degree of taste.

(Seventh Application Example)

Next, a seventh application will be described. The application is an application that can specify a so-called spam group.

Figure 8:
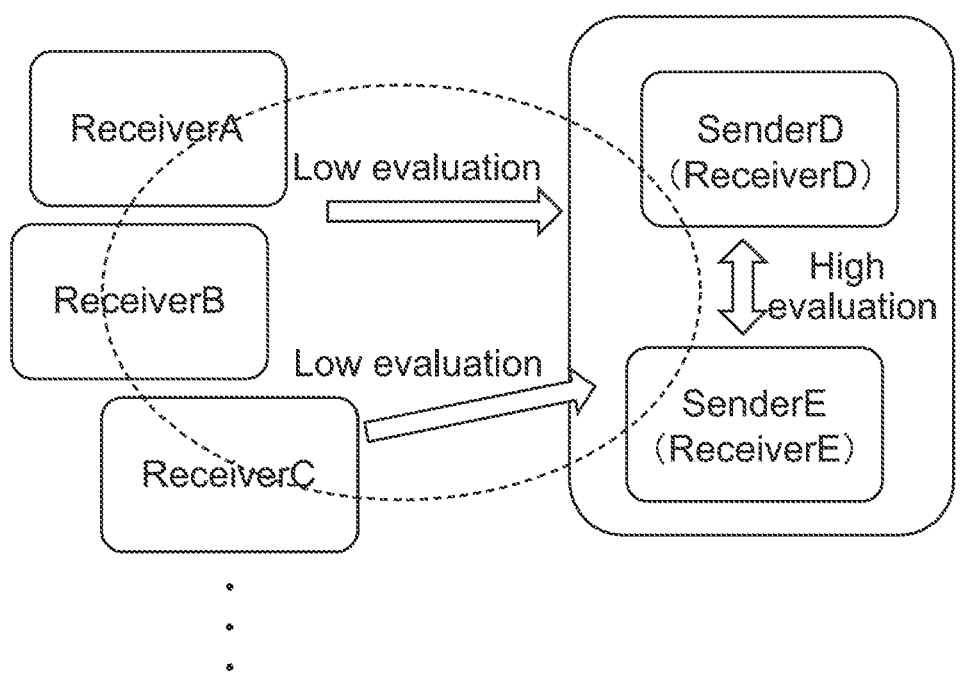
FIG. 8 is a diagram showing an example of another application according to the first embodiment of the present disclosure.

FIG. 8 is a diagram conceptually showing processing of the application.

As shown in FIG. 8, evaluation of receivers A, B, C, and other many receivers with respect to information sent from senders D and E is considerably low as a whole. On the other hand, the senders D and E highly evaluate each other as a receiver, and have a common favorite cluster.

In such a case, the senders D and E are considered to be a cult group, and be likely to be a spam group.

In the case where evaluation of some nodes with respect to post information is high and evaluation of other many nodes (receivers) with respect to the post information is low, the SNS server 100 searches for the nodes that have evaluated the post information highly. Further, the SNS server 100 can specify a biased group as a group that is likely to be a spam group by checking evaluation with respect to other post information sent from the nodes.

An operator of the SNS server 100 can save the trouble of determining a spam group by confirming actual sending information sent from the autodetected group. With the application, the SNS server 100 can perform the detection of the spam group without a spam report from an SNS user.

In this way, the SNS server 100 can provide information with low user noise by excluding a user who is determined to belong to a spam group from a service. Moreover, the SNS server 100 can exclude post information sent from a spam group before analyzing data with high quality.

(Eighth Application Example)

Next, an eighth application will be described. The application is an application that has a community recommendation function and a community ranking function using evaluation with respect to a community.

Some SNS have a community function created by users. The application in this example can regard evaluation of a member of a community with respect to sending information sent to outside of the community as evaluation of the community, similarly to the group evaluation at the time of the determination of a spam group by the seventh application. The application can recommend an entry or reference registration to a community which is highly evaluated in a favorite cluster of a receiver, and display community ranking for each cluster, by using the evaluation.

(Ninth Application Example)

Next, a ninth application will be described. The application is an application for both of a sender and a receiver, which recommends to browse, in the case where there is a cluster, which is opposed to an advantage cluster or a favorite cluster of a user and includes predetermined number or more of users, post information sent from a sender who has the cluster as an advantage cluster, or evaluation information sent from a receiver who has the cluster as a favorite cluster.

Accordingly, the user can broaden his/her perspective with the help of opinions, which are opposed to his/her opinion.

(Tenth Application Example)

Next a tenth application will be described. The application is a market analysis application that can visualize the number of supporters of opinions or the difference in the momentum in opposing clusters.

Specifically, the SNS server 100 regards the number of users who have a common favorite cluster as the number of supporters with respect to an opinion/taste, and generates information for displaying it in comparison for each favorite cluster.

The information is applicable to marketing and the like by being collected/displayed for each area to which a user belongs, for example. For example, an operator of the SNS server 100 can specify boundaries between an area in which a baseball team B is more popular than a baseball team A and an area in which the baseball team A is more popular than the baseball team B, and determine an area in which a commodity for a fan of the team is sold, by the method described above.

(Eleventh Application Example)

Next, an eleventh application will be described. The application is an application that can find, in the case where evaluation of members with respect to information is divided depending on clusters, a cluster in which evaluation of the similar members to those of the case is divided similarly to the case out of the existing clusters, and detect a correlation between the clusters.

Specifically, the application can find a favorite group by detecting a group whose measurement methods with respect to information are similar to each other by using that in the case where reception evaluation with respect to information is significantly divided between a group A and a group B, it is likely that reception evaluation with respect to other information is also divided between the group A and the group B.

Also the application may be used for market analysis and the like. For example, in the case where there are a correlation between opposing foods of a food A and a food B, and a correlation between opposing baseball teams of a baseball team A and a baseball team B, a marketing method in which the food A is sold for a fan of the baseball team A and the food B is sold for the baseball team B can be realized.

Second Embodiment

Next, a second embodiment of the present disclosure will be described.

Figure 9:
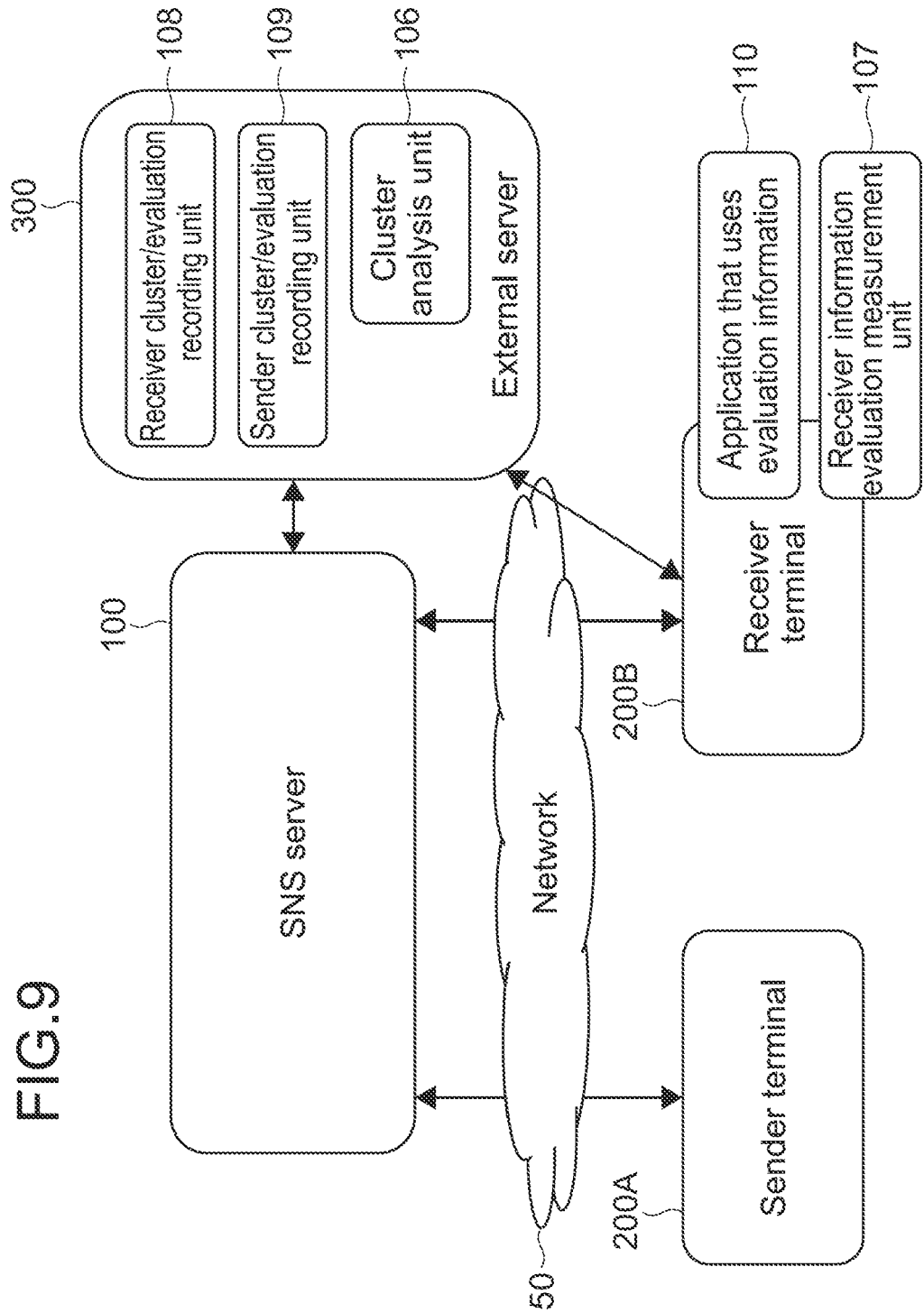
FIG. 9 is a diagram showing a network configuration and a software module configuration of a system according to a second embodiment of the present disclosure.

FIG. 9 is a diagram showing a network configuration and a software module configuration of a system according to this embodiment.

In the first embodiment, all of the mechanisms (software modules) for evaluation of a sender and evaluation of a receiver are provided to the SNS server 100. However, as shown in FIG. 9, in the second embodiment, the cluster analysis unit 106, the receiver cluster/evaluation recording unit 108, and the sender cluster/evaluation recording unit 109 are provided not to the SNS server 100 but to an external server 300.

The receiver information evaluation measurement unit 107 and the application 110 are provided to the receiver terminal 200B.

The communication control unit 101, the information input unit 102, the information display unit 103, and the authentication unit 104 are provided to the SNS server 100 similarly to the embodiment described above.

In this case, the external server 300 receives, from the SNS server 100, post information sent from the sender terminal 200A, and receives, from the receiver terminal 200B, evaluation information measured in the receiver terminal 200B.

The measurement of evaluation information of a receiver in the receiver terminal 200B is performed by obtaining a scroll speed of a Web browser by a plugin installed in the Web browser, for example.

Accordingly, a load of the SNS server 100 associated with the processing of determining a favorite cluster or an advantage cluster is alleviated.

[Modified Example]

The present disclosure is not limited to the embodiments described above, and various modifications can be made without departing from the gist of the present disclosure.

(Modified Example 1)

In the first and second embodiments described above, the receiver cluster/evaluation recording unit 108 may perform recursive evaluation, which increases value of information in which a user who is highly evaluated as a sender is interested. Specifically, the receiver cluster/evaluation recording unit 108 applies weights to evaluation of a sender who has a specific advantage cluster with respect to post information sent from another user who is classified into the same cluster as the advantage cluster as more important information.

(Modified Example 2)

In the embodiments described above, clustering processing by the cluster analysis unit 106 is performed based on a dictionary, but another method may be used. For example, a method such as Ward method and k-means clustering may be used. Further, the following method described in International Publication No. 06/087854 may be used.

Specifically, the cluster analysis unit 106 calculates an evaluation distance between a median point that belongs to a plurality of populations including sample information for each population of the sample information, and sample information to be classified (target sample), and calculates statistical information on the evaluation distance such as an average, a dispersion, and a standard deviation for each population, first. Next, the cluster analysis unit 106 evaluates an evaluation distance of sample information with respect to the population based on the evaluation distance and the statistical information, evaluates the degree of belonging to the population of the target sample, determines which population the target sample is caused to belong to depending on the degree of belonging, and causes the target sample to belong to the population. Further the cluster analysis unit 106 calculates an evaluation distance between a median point for each updated population and a target sample that belongs to the updated population, generates a new population in the case where the degree of belonging to the population is out of a predetermined range, and causes the target sample to belong to the population.

[Others]

It should be noted that the present disclosure may also take the following configurations.

(1) An information processing apparatus, including:
  a communication unit; and
  a control unit configured
    to control the communication unit to receive a plurality of pieces of post information sent from a first user,
    to obtain a plurality of pieces of evaluation information of another user with respect to the received plurality of post information,
    to classify the plurality of pieces of post information into a plurality of clusters, and
    to determine, as an advantage cluster of the first user, a cluster with the highest evaluation in the plurality of pieces of evaluation information out of the plurality of clusters.

(2) The information processing apparatus according to (1), in which
  the control unit is configured to classify a plurality of pieces of evaluation information sent from a second user into a plurality of clusters, and determine, as a favorite cluster of the second user, a cluster with the highest evaluation out of the plurality of clusters.

(3) The information processing apparatus according to (1) or (2), in which
  the control unit is configured to control the communication unit to send information that represents the advantage cluster of the first user in response to a request from an apparatus used by a second user.

(4) The information processing apparatus according to (2) or (3), in which
  the control unit is configured to control the communication unit to send information that represents the favorite cluster of the second user in response to a request from an apparatus used by the first user.

(5) The information processing apparatus according to any one of (2) to (4), in which
  the control unit is configured to control the communication unit to send, to an apparatus used by the second user, recommendation information that recommends to continuously receive post information sent from the first user in a case where the advantage cluster of the first user and the favorite cluster of the second user are the same.

(6) The information processing apparatus according to any one of (2) to (5), in which
  the control unit is configured to classify the received plurality of post information into any one of the plurality of clusters, and control the communication unit so that the received plurality of post information are received by only an apparatus used by a user who has a favorite cluster that is the same as the classified cluster.

(7) The information processing apparatus according to any one of (2) to (6), in which
  the control unit is configured to classify commodity information on a predetermined commodity into any one of the plurality of clusters, and output, as an evaluation value of the commodity information, a value obtained by applying weights to evaluation information of different users with respect to the commodity information by the degree of taste of the different users with respect to the classified cluster.

(8) The information processing apparatus according to any one of (2) to (7), in which
  the control unit is configured
    to classify one of each of a plurality of pieces of commodity information and each of a plurality of pieces of article information into any one of the plurality of clusters,
    to extract evaluation information sent from a user whose favorite cluster is the same as the classified cluster out of evaluation information of a plurality of users with respect to one of the plurality of pieces of commodity information and the plurality of pieces of article information, and
    to generate recommendation information that recommends one of commodity information and article information with high evaluation in the extracted evaluation information out of one of the plurality of pieces of commodity information and the plurality of pieces of article information.

(9) The information processing apparatus according to any one of (2) to (8), in which
  the control unit is configured to specify a user group as a spam group in a case where it is detected that evaluation in a plurality of pieces of evaluation information with respect to post information sent from a plurality of users belonging to the user group is high in the user group, and low in the other many users, the user group including the plurality of users, the plurality of users having a common favorite cluster.

(10) The information processing apparatus according to any one of (1) to (9), in which the control unit is configured to generate recommendation information that recommends a community in a case where evaluation in evaluation information with respect to post information sent from a user belonging to the community is high, the community including a plurality of users whose favorite clusters are the same.

(11) The information processing apparatus according to any one of (2) to (10), in which the control unit is configured to generate recommendation information that recommends, for the second user, post information sent from a user, the post information belonging to a favorite cluster, a predetermined number or more of users having the favorite cluster, the favorite cluster being different from the favorite cluster of the second user.

(12) The information processing apparatus according to any one of (2) to (11), in which the control unit is configured to generate display information that displays the number of users for each favorite cluster, the users having a common favorite cluster.

(13) The information processing apparatus according to any one of (2) to (12), in which the control unit is configured to detect a correlation between a relationship between a first favorite cluster and a second favorite cluster with respect to first post information, and a relationship between a third favorite cluster and a fourth favorite cluster with respect to second posted information.

(14) The information processing apparatus according to any one of (1) to (13), in which the control unit is configured
to obtain evaluation information of the first user with respect to post information sent from another user,
to classify the post information into any one of the plurality of clusters, and
to increase an evaluation value that is represented by the evaluation information in a case where the classified cluster and the advantage cluster of the first user are the same.

The present disclosure contains subject matter related to that disclosed in Japanese Priority Patent Application JP 2012-082747 filed in the Japan Patent Office on Mar. 30, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a communication unit;
a memory configured to store instructions; and
one or more processors configured to execute the instructions stored in the memory, wherein the one or more processors are further configured to:
control the communication unit to receive a plurality of pieces of first post information sent from a first user;
obtain a plurality of pieces of evaluation information of a second user with respect to the received plurality of pieces of the first post information;
classify the received plurality of pieces of the first post information into a plurality of clusters;
determine, as an advantage cluster of the first user, a cluster with a highest evaluation value in the plurality of pieces of evaluation information among the plurality of clusters;
obtain evaluation of the first user with respect to second post information sent from the second user,
classify the second post information into one of the plurality of clusters; and
increase an evaluation value represented by the evaluation of the first user based on a determination that the one of the plurality of clusters into which the second post information is classified and the advantage cluster are the same.

2. The information processing apparatus according to claim 1, wherein the one or more processors are further configured to classify the plurality of pieces of evaluation information sent from the second user into the plurality of clusters, and determine, as a first favorite cluster of the second user, a cluster with the highest evaluation value out of the plurality of clusters.

3. The information processing apparatus according to claim 2, wherein the one or more processors are further configured to control the communication unit to send information that represents the first favorite cluster of the second user based on a request from an apparatus used by the first user.

4. The information processing apparatus according to claim 2, wherein the one or more processors are further configured to control the communication unit to send, to an apparatus used by the second user, recommendation information that recommends to continuously receive the plurality of pieces of the first post information sent from the first user in a based on a determination that the advantage cluster of the first user and the first favorite cluster of the second user are the same.

5. The information processing apparatus according to claim 2, wherein the one or more processors are further configured to classify the received plurality of pieces of the first post information into one of the plurality of clusters, and control the communication unit so that the received plurality of pieces of the first post information are received by an apparatus used by a user who has a second favorite cluster that is the same as the one of the plurality of clusters into which the second post information is classified.

6. The information processing apparatus according to claim 2, wherein the one or more processors are further configured to classify commodity information on a determined commodity into one of the plurality of clusters, and output, as an evaluation value of the commodity information, a value obtained by applying weights to evaluation information of different users with respect to the commodity information by a degree of taste of the different users with respect to the one of the plurality of clusters into which the second post information is classified.

7. The information processing apparatus according to claim 2, wherein the one or more processors are further configured to:
classify one of each of a plurality of pieces of commodity information and each of a plurality of pieces of article information into one of the plurality of clusters,
extract evaluation information, sent from a user whose favorite cluster is the same as the one of the plurality of clusters into which the second post information is classified, out of evaluation information of a plurality of users with respect to one of the plurality of pieces of commodity information and the plurality of pieces of article information, and generate recommendation information that recommends one of commodity information and article information based on the extracted evaluation information among the one of the plurality of pieces of commodity information and the plurality of pieces of article information.

8. The information processing apparatus according to claim 2, wherein the one or more processors are further configured to specify a user group as a spam group based on a determination that evaluation in a plurality of pieces of evaluation information with respect to post information sent from a plurality of users belonging to the user group is higher in the user group among a plurality of user groups, the user group including the plurality of users, the plurality of users having a common favorite cluster.

9. The information processing apparatus according to claim 2, wherein the one or more processors are further configured to generate recommendation information that recommends, for the second user, post information sent from a user, the post information belonging to a second favorite cluster, a determined number or more of users having the second favorite cluster, the second favorite cluster being different from the first favorite cluster of the second user.

10. The information processing apparatus according to claim 2, wherein the one or more processors are further configured to generate display information that displays number of users for each favorite cluster, the number of users having a common favorite cluster.

11. The information processing apparatus according to claim 2, wherein the one or more processors are further configured to detect a correlation between a relationship between the first favorite cluster and a second favorite cluster with respect to the first post information, and a relationship between a third favorite cluster and a fourth favorite cluster with respect to the second post information.

12. The information processing apparatus according to claim 1, wherein the one or more processors are further configured to control the communication unit to send information that represents the advantage cluster of the first user based on a request from an apparatus used by the second user.

13. The information processing apparatus according to claim 1, wherein the one or more processors are further configured to generate recommendation information that recommends a community based on evaluation value in evaluation information with respect to post information sent from a user belonging to the community, the community including a plurality of users whose favorite clusters are the same.

14. The information processing apparatus according to claim 1, wherein the plurality of pieces of evaluation information of the second user with respect to the received plurality of pieces of the first post information is obtained based on at least a scroll operation performed by the second user with respect to displayed post information.

15. The information processing apparatus according to claim 14, wherein the plurality of pieces of evaluation information is measured based on at least one of a scroll speed of the scroll operation or a duration for which the second user stops a scroll on the displayed post information.

16. The information processing apparatus according to claim 1, wherein the one or more processors are further configured to evaluate the first user based on a combination of overall evaluation of the plurality of pieces of the first post information sent from the first user per unit time and average evaluation of each of the plurality of pieces of the first post information.

17. An information processing method, comprising:
receiving a plurality of pieces of first post information sent from a first user;
obtaining a plurality of pieces of evaluation information of a second user with respect to the received plurality of pieces of the first post information;
classifying the received plurality of pieces of the first post information into a plurality of clusters;
determining, as an advantage cluster of the first user, a cluster with a highest evaluation value in the plurality of pieces of evaluation information among the plurality of clusters;
obtaining evaluation of the first user with respect to second post information sent from the second user,
classifying the second post information into one of the plurality of clusters; and
increasing an evaluation value represented by the evaluation of the first user based on a determination that the one of the plurality of clusters into which the second post information is classified and the advantage cluster are the same.

18. A non-transitory computer-readable medium having stored thereon computer-executable instructions that causes an information processing apparatus to execute operations, comprising:
receiving a plurality of pieces of first post information sent from a first user;
obtaining a plurality of pieces of evaluation information of a second user with respect to the received plurality of pieces of the first post information;
classifying the received plurality of pieces of first post information into a plurality of clusters;
determining, as an advantage cluster of the first user, a cluster with a highest evaluation value in the plurality of pieces of evaluation information among the plurality of clusters;
obtaining evaluation of the first user with respect to second post information sent from the second user,
classifying the second post information into one of the plurality of clusters, and
increasing an evaluation value represented by the evaluation of the first user based on a determination that the one of the plurality of clusters into which the second post information is classified and the advantage cluster are the same.

* * * * *